United States Patent [19]
Shadley

[11] 3,817,688
[45] June 18, 1974

[54] PIPE MOUNTING CLIP ARRANGEMENT
[75] Inventor: Glen W. Shadley, Herrin, Ill.
[73] Assignee: Fedders Corporation, Edison, N.J.
[22] Filed: Feb. 16, 1973
[21] Appl. No.: 333,194

[52] U.S. Cl................. 431/343, 248/56, 248/73, 165/67, 122/510
[51] Int. Cl............................................. F23d 13/24
[58] Field of Search................ 248/56, 57, 68 R, 73; 431/343; 165/67; 122/510

[56] References Cited
UNITED STATES PATENTS

| | | | |
|---|---|---|---|
| 1,755,394 | 4/1930 | Harbert.................................. | 248/56 |
| 2,503,448 | 4/1950 | Morris................................. | 432/105 |
| 2,534,690 | 12/1950 | Young et al...................... | 248/68 R |
| 2,810,012 | 10/1957 | Sugarman......................... | 248/67.7 |

*Primary Examiner*—Carroll B. Dority, Jr.
*Attorney, Agent, or Firm*—Ryder, McAulay, Fields, Fisher & Goldstein

[57] ABSTRACT

An improved pipe mounting system is provided adapted for use in securing a gas manifold pipe to the combustion chamber of a clothes drying machine. The sidewalls of the combustion chamber are provided with a pair of aligned openings to receive the manifold pipe and the system further includes a pair of spring clips positioned in cutouts in the combustion chamber walls The cutouts and ends of the clips cooperate to securely hold the clips in position exerting spring tension against the manifold pipe.

7 Claims, 5 Drawing Figures

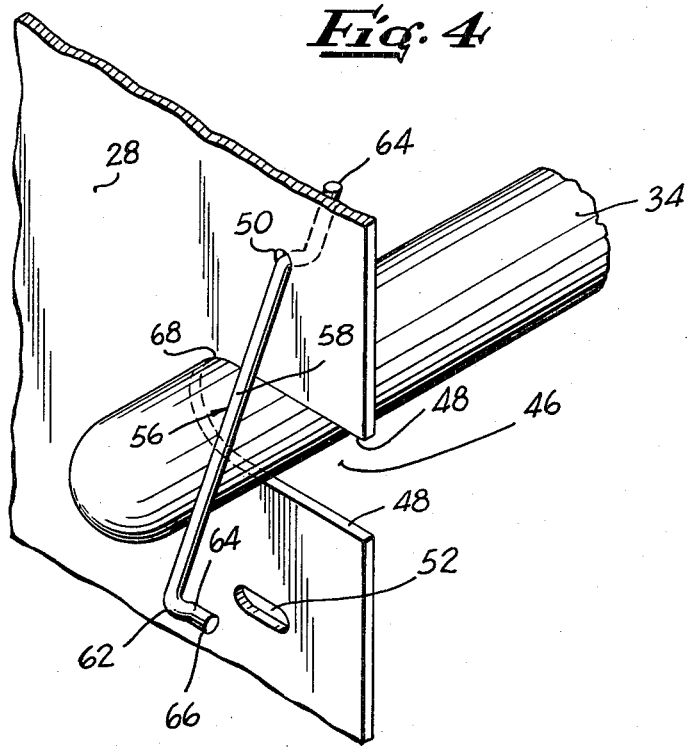
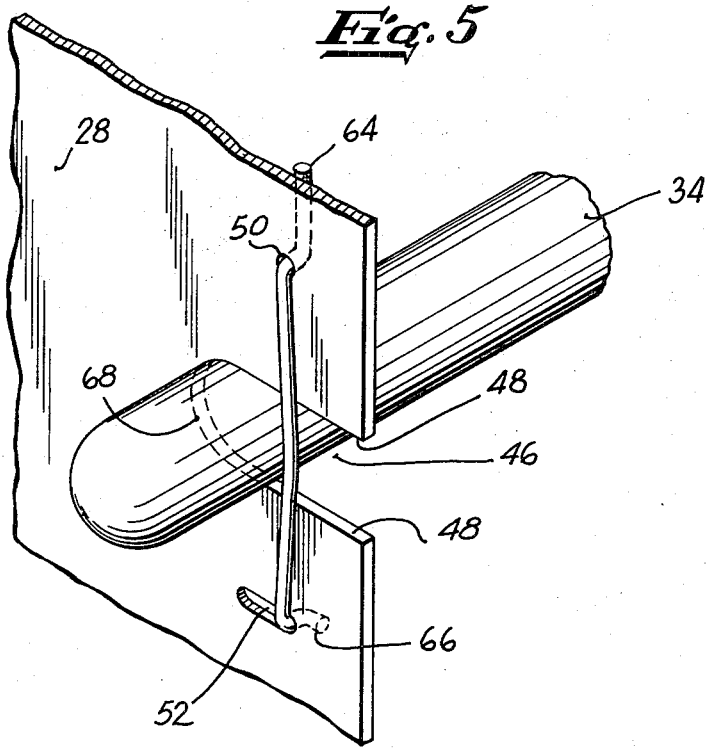

PIPE MOUNTING CLIP ARRANGEMENT

BACKGROUND OF THE INVENTION

The present invention relates to an improved system for mounting pipes and the like and particularly to a system which is useful in the mounting of the gas manifold pipe of a clothes drying machine.

The requirements for the mounting means for the gas manifold pipe of a clothes dryer are: rapid assembly, service-ability, and positive, rattle-free securement. In addition, low initial and replacement costs are important considerations.

Heretofore, the customary manner of mounting the manifold pipe in position within the dryer combustion chamber was by means of threaded fasteners such as screws or nuts and bolts. The principal disadvantage of this system is that in due course, vibrations caused by the rotation of the dryer drum causes the threaded fasteners to loosen which, in turn, cause the manifold to vibrate. In addition, the initial assembly of the manifold and subsequent maintenance requires a relatively high amount of labor and hence manpower expense.

In view of the above, it is the principal object of the present invention to provide a simplified arrangement for mounting pipes and the like which overcomes the disadvantages of the prior art arrangements.

SUMMARY OF THE INVENTION

The above and other beneficial objects and advantages are attained in accordance with the present invention by providing a system for securing a pipe or other tubular member to a wall. The system comprises in combination surfaces of the wall defining an opening sufficiently large to accept the tubular member and first and second holes extending through the wall on opposite sides of the opening and positioned along a line intersecting the opening. The system further includes an elongated resilient clip having end portions adapted to engage the holes in a secure engagement. In operation, the tube is first positioned through the wall opening and then the clip ends secured to their associated holes. To effect this, force must be exerted on the clip so as to deform it out of alignment with the portion of the opening through which the tubular member passes. When the force is released, the clip tends to return to its normal position thereby exerting a biasing force on the tube urging it against the wall and thereby securely holding the tube in position.

DETAILED DESCRIPTION OF THE PREFERRED EMBODIMENT

Figure 1:
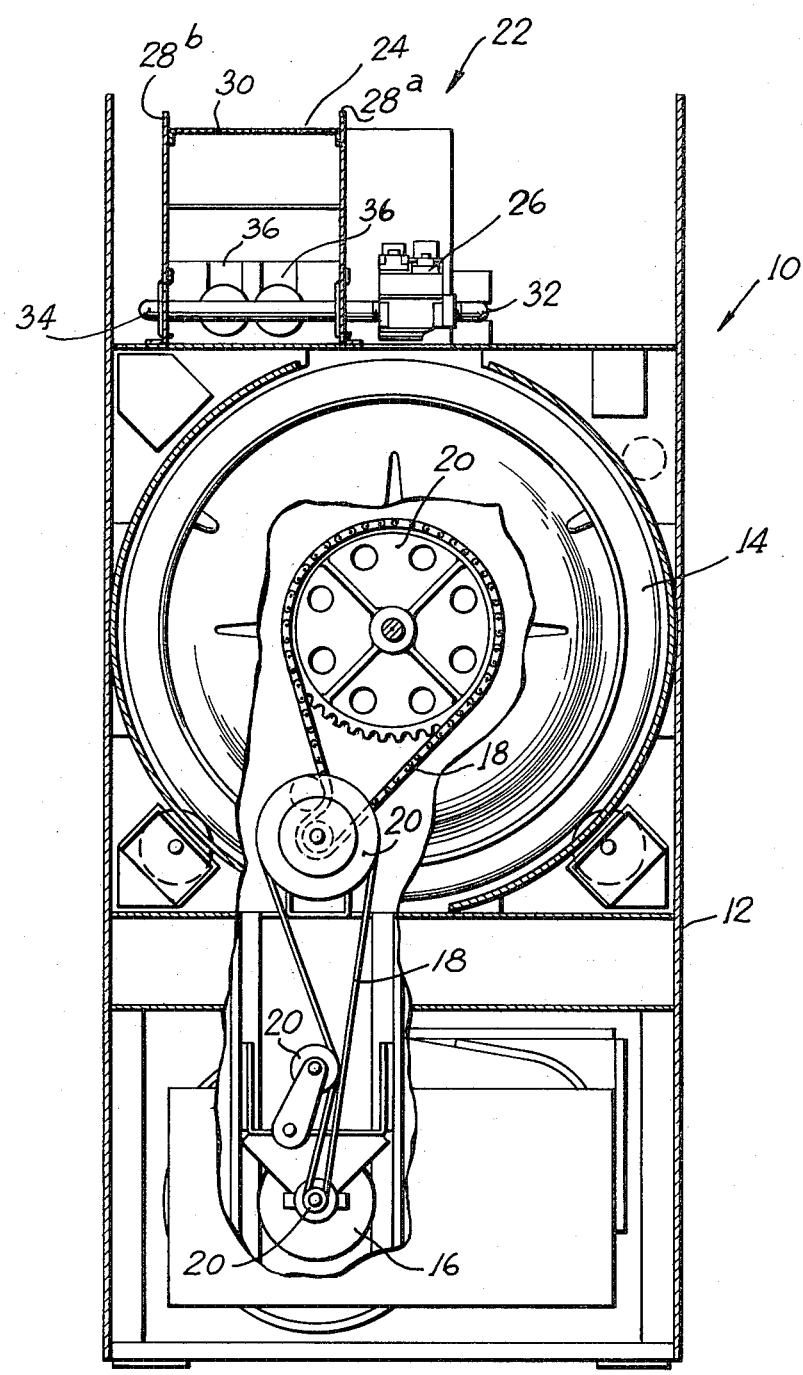
FIG. 1 is a front elevational sectional view of a commercial gas clothes drying machine utilizing the mounting system of the present invention to secure the manifold pipe in position.
Figure 2:
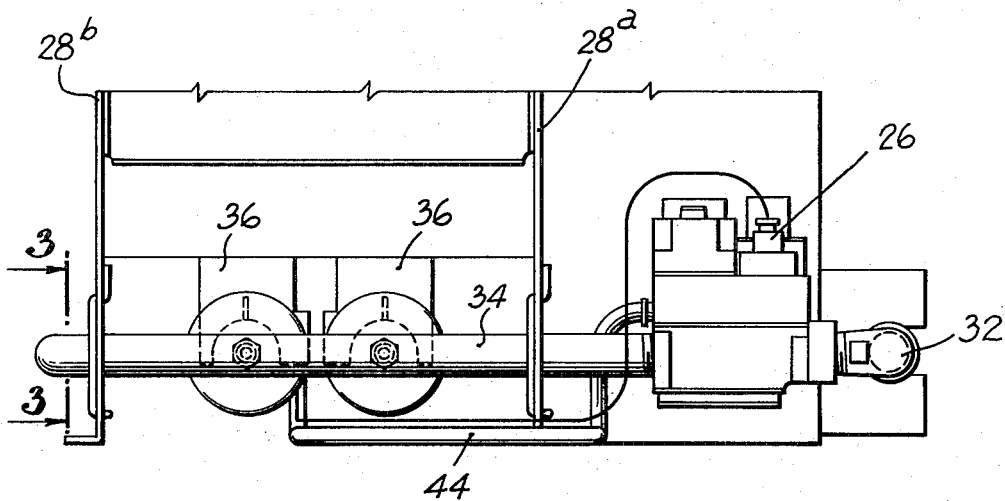
FIG. 2 is an enlarged front elevational sectional view of the combustion chamber of the dryer.

Reference is now made to the drawings wherein similar components bear the same reference numeral throughout the several views. In FIG. 1, a commercial, gas operating clothes drying machine 10 is illustrated. The machine includes a cabinet 12 containing therein a rotating perforated cylinder 14 having an access opening extending through the cabinet and designed to receive the wet clothes to be dried. The cylinder 14 is rotated in a conventional manner by motor 16 mounted in the dryer base through a series of belts and chains 18 and pulleys 20.

The heating unit 22 for the dryer is mounted at the dryer top. The heating unit includes a combustion chamber generally designated by numeral 24 along with suitable controls 26 including gas valves and the like. Actual combustion is confined to the chamber by walls 28a and 28b extending parallel to the cabinet walls and a covering shroud 30.

Figure 3:
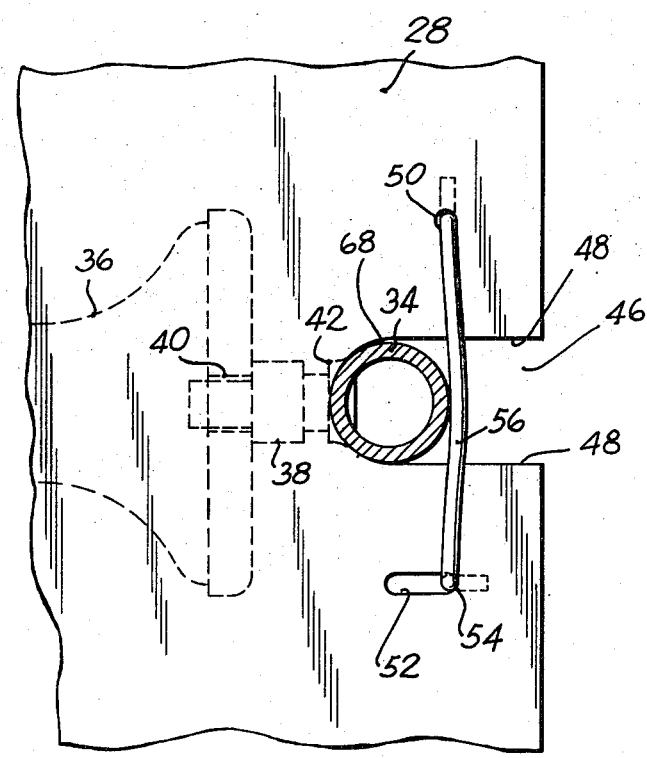
FIG. 3 is an enlarged fragmentary side elevational sectional view taken along line 3—3 of FIG. 2 in the direction indicated by the arrows; and, FIGS. 4 and 5 are fragmentary perspective views illustrating the manner of assembling the present mounting system.

The dryer is of the gas fired type and accordingly, includes an inlet pipe 32 which passes through the sections containing controls 26 and then feeds a manifold pipe 34 which in turn feeds burners 36. Each of the burners 36 is connected to the manifold pipe by means of a suitable orifice 38, which screws into a threaded boss 42 in the manifold and inserts into a hole 40 in the burner 36 as shown in FIG. 3. To insure proper ignition of the gas emanating from the burners, a pilot tube 44 interconnects the burners with the controls.

As stated, the present invention relates specifically to the manner of mounting the manifold 34 within the combustion chamber. In this connection, each of the combustion chamber walls 28a and 28b includes surfaces defining an opening 46 sufficiently large to accommodate the manifold pipe 34. As shown most clearly in FIG. 3, opening 46 is U-shaped with the rounded portion 68 substantially equal in diameter to that of manifold pipe 34 and the parallel straight side portions 48 extending all the way to the edge of the wall. The openings in walls 28a and 28b are aligned so as to receive manifold pipe 34 as it enters the combustion chamber from the control section first through wall 28a and through wall 28b. In addition to the opening 46, each of the walls 28 is provided with a pair of holes 50 and 52 positioned across the associated opening from each other. As shown in FIGS. 4 and 5, hole 50 is generally circular while hole 52 is elongated horizontally. The end 54 of hole 52 furthest from the rounded base portion of opening 46 is substantially in vertical alignment with hole 50.

The present mounting arrangement further entails the use of a spring clip 56 which comprises an elongated shank portion 58 substantially equal in length to the straight line distance between holes 50 and 52 and a pair of end sections 60 and 66 out of line with the shank portions. A first end section 60 extends longitudinally beyond one end of shank 58 after first and second right angle bends thereby increasing the overall length of clip 56. The other end of shank 58 makes a first right angle bend 62 and then a second right angle bend 64 so that the end section 66 extends perpendicular to the longitudinal axis of shank 58. The diameter of end portion 60 is somewhat less than the diameter of hole 50. The diameter of the transverse end section 66 is less than the width of opening 52 and the length of section 66 is shorter than the length of the elongated opening 52. Thus, end 60 is able to pass through hole 50 and end 66 is able to pass through hole 52.

As seen most clearly in FIG. 3, holes 50 and 52 are positioned along a line spaced from the base 68 of the rounded portion of cutout 46 a distance slightly less than the diameter of manifold pipe 34. The clip is formed of a resilient material which enables it to be deformed out of the path of the manifold pipe for installation purposes and thereafter attempt to resume its undeformed shape. Thus, when the deforming force is removed, the clip tends to exert a biasing force on the pipe urging it against the base of the U-shaped cutout and thereby securely holding the pipe in position.

The manner of installing a manifold pipe in position is shown in FIGS. 4 and 5. Accordingly, pipe 34 is first positioned within cutout 46 seated in the rounded portion 68 of the cutout. End 60 of the clip is passed through hole 50 and the other end 66 of the clip is passed through hole 52 after first deforming the shank portion 58 of the clip around pipe 34. The pipe exerts an outward force on the clip thereby tending to lock the transverse section 66 of the clip behind the wall adjacent cutout end 52. At the same time, the clip exerts a force on the pipe urging the pipe securely against the rounded portion 68 of the cutout. In this manner, the pipe is securely held in position with spring tension which provides for long-term, anti-rattle securement. If, for any reason, the manifold pipe must be removed, end 66 of the clip is urged toward the pipe until the transverse section clears the cutout 52 after which the other end 60 may readily be removed from hole 50.

Thus, in accordance with the above, the aforereferenced objectives are effectively retained. It should be understood that modifications may be made in the illustrated and described embodiment of the invention without departing from the invention as set forth in the accompanying claims.

Having thus described the invention, what is claimed is:

1. A system for securing a tubular member to a wall comprising in combination: an opening in said wall sufficiently large to accept said tubular member; first and second holes in said wall on opposite sides of and adjacent said opening, and an elongated resilient clip, said clip having a first end section extending through said first hole and a second end section extending through said second hole and a generally straight body portion extending between said ends intersecting part of said opening, said end portions being normal to said straight body portions, said body portion being adapted to bend so as to resiliently urge said tubular member against the surface of said wall member defining said opening to thereby secure said tubular member to said wall.

2. The invention in accordance with claim 1 wherein said wall opening is U-shaped having a rounded base portion and parallel side portions, and the diameter of said tubular member is substantially equal to the rounded portion of said U-shaped opening.

3. The invention in accordance with claim 2 wherein said clip includes having a first end section extending parallel to the longitudinal axis of said straight body portion and one of said holes comprises an elongated slot larger than said second end section and extending perpendicular to a line, interconnecting said first and second holes.

4. The invention in accordance with claim 1 wherein said tubular member comprises a gas manifold pipe and said wall constitutes a portion of the combustion chamber of a gas dryer.

5. A gas dryer comprising in combination: a combustion chamber having first and second spaced apart walls; a manifold pipe adapted to supply gas to said burners, said manifold pipe connected with one or more burners within said combustion chamber and entering said chamber through one of said walls and exiting said chamber through the other of said walls, and means for securing said pipe to at least one of said walls including an opening in said one wall sufficiently large to accept said manifold pipe, first and second holes in said wall on opposite sides of and adjacent said opening, and an elongated resilient clip said clip having a first end portion extending through said first hole, a second end portion extending through said second hole, and a generally straight body portion extending between said ends, said ends being normal to said straight body portion, said body portion being adapted to bend so as to resiliently urge said manifold pipe against the surface of said wall member defining said opening to thereby secure said manifold pipe to said wall.

6. The invention in accordance with claim 5 wherein said one wall opening is U-shaped having a rounded base portion and parallel side portions, and the diameter of said manifold pipe is substantially equal to the rounded portion of said U-shaped opening.

7. The invention in accordance with claim 6 wherein said clip includes a first end section extending parallel to the longitudinal axis of said straight body portion and one of said holes comprises an elongated slot larger than said second end section and extending perpendicular to a line, interconnecting said first and second holes.

* * * * *